Nov. 9, 1965  G. E. GOLLWITZER  3,216,105
METHOD OF MANUFACTURING BRAKE DRUMS
Filed July 18, 1962
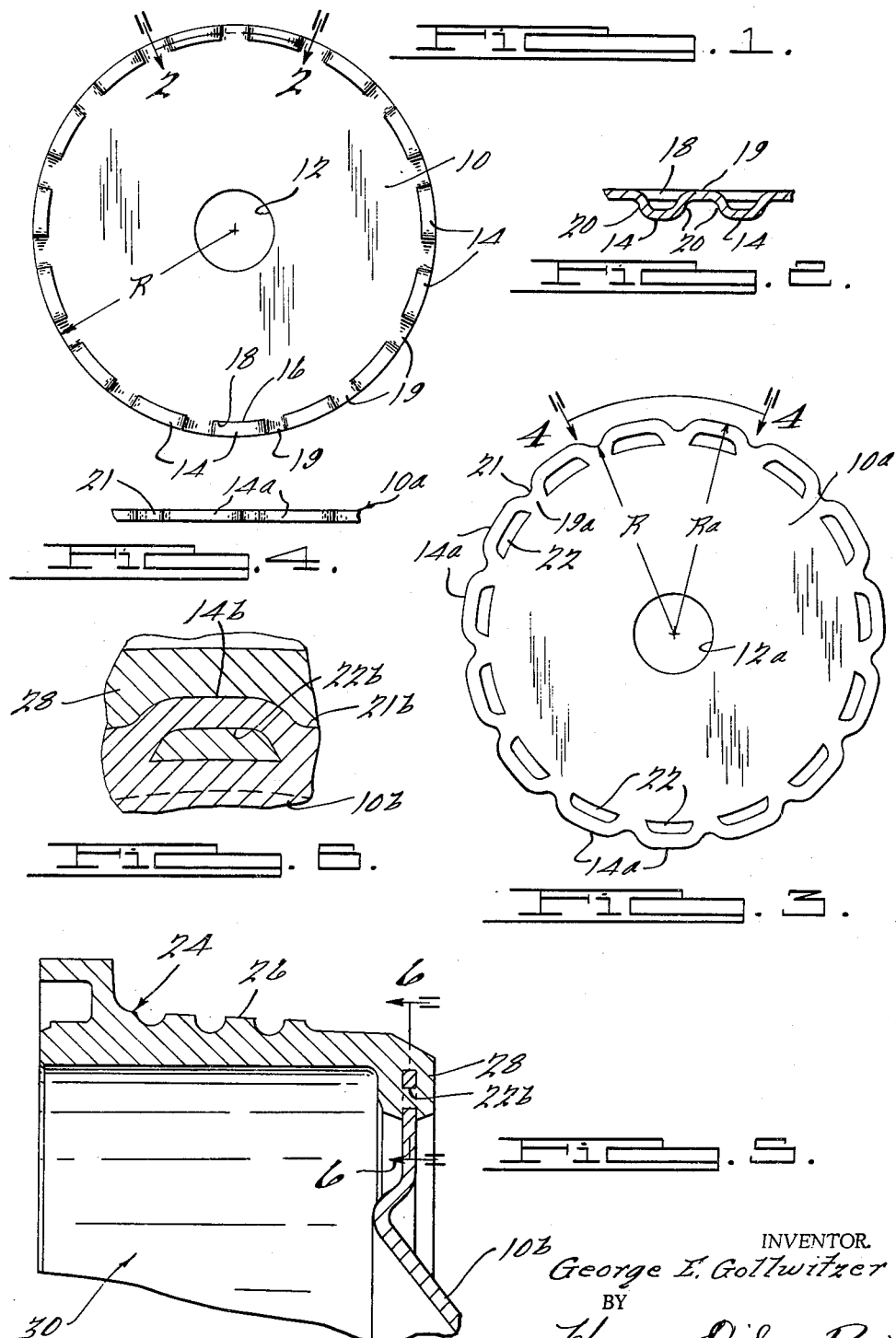
INVENTOR.
George E. Gollwitzer
BY
Harness, Dickey & Pierce
ATTORNEYS

United States Patent Office 3,216,105
Patented Nov. 9, 1965

3,216,105
METHOD OF MANUFACTURING BRAKE DRUMS
George E. Gollwitzer, Belleville, Mich., assignor to Kelsey-Hayes Company, Romulus, Mich., a corporation of Delaware
Filed July 18, 1962, Ser. No. 210,678
3 Claims. (Cl. 29—527)

This invention relates to a method of manufacturing brake drums for use on automotive or other type vehicles.

Conventionally, brake drums are formed of a cast annular rim and a stamped sheet metal back member. It is common practice to scallop or otherwise form a plurality of notches or grooves at the peripheral edge of the back member and to cast the rim to partially overlap this peripheral edge with the material of the rim filling in the scalloped edges to thereby securely retain the back member to the rim. In the formation of the peripheral notches or scalloped edge of the backup member, it is conventional practice to stamp out these portions from a disk of a desired diameter. This procedure results, of course, in a certain amount of scrap. In the method of the present invention a back member of the desired diameter is formed without scrap, and hence the amount of material initially required is less. It is an object of this invention to provide a method for making a brake drum using less material and resulting in a reduction in material costs.

Other objects, features, and advantages of the present invention will become apparent from the subsequent description and the appended claims, taken in conjunction with the accompanying drawings, in which FIGURE 1 is a plan view of a brake back member after the first step of the method of this invention;

FIGURE 2 is a sectional view of the brake back member of FIGURE 1 taken substantially along the line 2—2 of FIGURE 1;

FIGURE 3 is a plan view of the brake back member after a second step in the method of this invention;

FIGURE 4 is a fragmentary view of the brake back member of FIGURE 3 taken substantially in the direction of line 4—4 in FIGURE 3;

FIGURE 5 is a fragmentary sectional view depicting a brake backup member formed in accordance with the teachings of this invention in relationship to a cast brake rim; and FIGURE 6 is an enlarged sectional view of a portion of the brake drum assembly shown in FIGURE 5 and taken substantially along the line 6—6 in FIGURE 5.

Looking now to FIGURES 1 and 2, an annular flat disk 10 having a centrally disposed bore 12 is depicted after the first step of the method of this invention. In this step, a plurality of radially, circumferentially disposed, axially inwardly (into the plane of the drawing) extending projections or indentations 14 are formed at the periphery of the disk 10, to be axially offset relative to the plane of the remainder of the disk 10, with each of the projections 14 being severed, sheared, or otherwise separated at its radially inner edge 16 from the adjacent portion 18 of the disk 10 and with adjacent circumferential ends of consecutive ones of the projections 14 being connected by connecting portions 19, which are located in the plane of the remainder of disk 10. The projections 14 are substantially equally, circumferentially spaced about the periphery of the disk 10 with each projection 14 being formed with substantially axially inwardly extending flange portions 20.

In the next step, the disk 10, having the plurality of projections or indentations 14 about its periphery, is placed between two flat dies (not shown) which, in exerting an axial force i.e. normal to the plane of the disk between the upper and lower surfaces of the disk 10, flatten the projections 14 into the same plane as the remainder of the disk 10. In so flattening the projections 14, the metal in the projection tends to flow in the direction of least resistance; since the flange portions 20 extend substantially axially and offer considerable resistance to movement of each of the projections 14 thereagainst, the projections 14 are moved radially outwardly. As the projections 14 move radially outwardly they form a plurality of slots 22 along the line of separation between the projections 14 (i.e., edge 16) and the adjacent portions 18 of the disk 10. Since the portions 19 (indicated as 19a in FIGURE 3) adjoining adjacent projections 14 remain substantially in the same location, the projections 14, upon being flattened, form radially outwardly extending ridges 14a which define with the portions 19a a plurality of grooves 21, between adjacent ridges 14a, to thereby peripherally provide a disk 10a with a scalloped construction. As can be seen in FIGURE 4, the disk 10a is substantially planar.

A comparison of the disk 10 of FIGURE 1 and disk 10a of FIGURE 3 shows that the radial distance, indicated by radius line R, to the extremity of each of the connecting portions 19 and 19a is the same. However, the radial dimension to the peripheral edge of the ridges 14a, as indicated by the radius line $R_a$ is greater than the radius R. In conventional practice, in order to form a disk having an outer peripheral configuration, similar to that of the disk 10a (FIGURE 3), an annular blank having a radius equal to $R_a$ would be used with the slots and/or ridges and grooves formed by removing material therefrom.

With the method of this invention as thus far described, an annular blank having a radius equal to radius R can be utilized, hence resulting in the use of less material to eventually form a disk of a radius $R_a$.

After the steps previously described, the disk 10a can be stamped or otherwise formed to a desired shape to form a brake back 10b partially shown in FIGURE 5.

As previously mentioned, it is conventional practice to cast the brake rim to peripherally overlap or surround a portion of the brake back. In the brake drum 30 of FIGURE 5, the rim 24 has a generally annularly extending rim portion 26 which terminates at one end in a radially downwardly extending annular flange 28. The annular flange 28 is cast over the peripheral edge of the brake back 10b such that the material in the formation of the flange 28 flows through the slots 22b and in and around the grooves 21b and ridges 14b (FIGURES 5 and 6) to thereby completely secure the brake back 10b to the annular flange 28 of the brake drum rim 24. Note that the ridges 14b and grooves 21b are effective along with slots 22b to prevent relative rotation between the brake back 10b and the drum rim 24.

Thus, in accordance with the method as previously described, a brake drum 30 can be formed utilizing a brake back member 10b which is formed by steps requiring a smaller amount of material than is required in conventional practice, hence resulting in a cost savings in material used.

While it will be apparent that the preferred embodiments of the invention disclosed are well ccalculated to fulfill the objects above stated, it will be appreciated that the invention is susceptible to modification, variation and change without departing from the proper scope or fair meaning of the subjoined claims.

What is claimed is:

1. The method of manufacturing a brake drum comprising the steps of forming at the periphery of a flat annular disk a plurality of axially extending, circumferentially spaced projections separated from the disk at their radially inner edges, flattening the plurality of projections substantially into the plane of the remainder of the disk to move the material of the projections a substantial distance radially outwardly to form thereby a plurality of slots along the line of separation between the projections and the adjacent portions of the disk, and casting an annular brake rim with a radially inwardly extending flange portion thereof surrounding the peripheral edge of the disk and with the material of the flange portion flowing through the slots in the disk, said slots defining an opening facilitating the flow of a substantial quantity of the material of said brake rim therethrough.

2. The method of manufacturing a brake back for a brake drum comprising the steps of forming at the periphery of a flat annular disk a plurality of axially extending, circumferentially spaced projections separated from the disk at their radially inner edges, and flattening the plurality of projections substantially into the plane of the remainder of the disk to move the material of the projections a substantial distance radially outwardly to form thereby a plurality of slots along the line of separation between the projections and the adjacent portions of the disk.

3. The method of manufacturing a brake back for a brake drum comprising the steps of forming at the periphery of a flat annular disk having a preselected diameter a plurality of axially extending, circumferentially spaced projections separated from the disk at their radially inner edges, and flattening the plurality of projections substantially into the plane of the remainder of the disk to move the material of the projection a substantial distance radially outwardly to an extremity having a diametrical dimension greater than the preselected diameter and to form thereby a plurality of slots along the line of separation between the projections and the adjacent portions of the disk.

References Cited by the Examiner

UNITED STATES PATENTS

| 1,055,675 | 3/13 | Smith. | |
| 2,129,199 | 9/38 | Dake | 188—218 |
| 2,145,046 | 1/39 | Gettig | 29—545 X |
| 2,692,019 | 10/54 | Zalkind | 113—116 X |

WHITMORE A. WILTZ, *Primary Examiner.*